(12) United States Patent
Grosby

(10) Patent No.: US 9,813,905 B2
(45) Date of Patent: Nov. 7, 2017

(54) DTMF TOKEN FOR AUTOMATED OUT-OF-BAND AUTHENTICATION

(71) Applicant: U.S. Bank, National Association, Minneapolis, MN (US)

(72) Inventor: Sam Grosby, Minneapolis, MN (US)

(73) Assignee: U.S. BANK, NATIONAL ASSOCIATION, Minneapolis, MN (US)

( * ) Notice: Subject to any disclaimer, the term of this patent is extended or adjusted under 35 U.S.C. 154(b) by 434 days.

(21) Appl. No.: 14/053,437

(22) Filed: Oct. 14, 2013

(65) Prior Publication Data

US 2015/0105046 A1 Apr. 16, 2015

(51) Int. Cl.
| | | |
|---|---|---|
| H04M 1/66 | (2006.01) | |
| H04W 12/06 | (2009.01) | |
| H04L 29/06 | (2006.01) | |
| H04W 4/12 | (2009.01) | |

(52) U.S. Cl.
CPC ......... *H04W 12/06* (2013.01); *H04L 63/0853* (2013.01); *H04L 63/18* (2013.01); *H04W 4/12* (2013.01)

(58) Field of Classification Search
CPC .... H04W 12/06; H04W 4/12; H04L 63/0823; H04L 63/08; H04L 63/0853; H04L 63/18
USPC ............... 455/411, 418–422.1, 456.1, 412.2; 713/168, 155; 726/5, 10
See application file for complete search history.

(56) References Cited

U.S. PATENT DOCUMENTS

| | | | |
|---|---|---|---|
| 5,907,597 A | 5/1999 | Mark | |
| 5,949,874 A | 9/1999 | Mark | |
| 6,771,751 B1* | 8/2004 | Kasturi | ................... H04L 12/66 |
| | | | 341/173 |
| 6,934,858 B2 | 8/2005 | Woodhill | |
| 7,353,388 B1 | 4/2008 | Gilman et al. | |
| 7,574,733 B2 | 8/2009 | Woodhill | |
| 7,870,599 B2 | 1/2011 | Pemmaraju | |
| 8,296,562 B2 | 10/2012 | Williams et al. | |
| 8,484,698 B2 | 7/2013 | Pemmaraju | |
| 8,646,060 B1* | 2/2014 | Ben Ayed | ........... H04L 63/0853 |
| | | | 726/9 |
| 9,350,717 B1* | 5/2016 | Siddiqui | ................. H04L 63/08 |
| 2006/0041755 A1 | 2/2006 | Pemmaraju | |
| 2007/0255662 A1* | 11/2007 | Tumminaro | ......... G06Q 20/027 |
| | | | 705/79 |
| 2008/0059372 A1* | 3/2008 | Lee | ...................... G06Q 20/105 |
| | | | 705/41 |
| 2008/0172230 A1* | 7/2008 | Hayakawa | .............. G10L 17/14 |
| | | | 704/249 |
| 2009/0025075 A1 | 1/2009 | Chow et al. | |
| 2009/0259848 A1* | 10/2009 | Williams | ............ H04L 63/0838 |
| | | | 713/168 |

(Continued)

*Primary Examiner* — Babar Sarwar
(74) *Attorney, Agent, or Firm* — Foley & Lardner LLP

(57) ABSTRACT

Methods, systems, and media for facilitating an automatic out-of-band authentication process that includes a DTMF token. The process involves receiving an authentication token via one network and automatically sending the token back through a different network. In some cases, the process may be performed without the need for any human interaction. One of the tokens is a DTMF signal that may be sent on its own or during a voice communication session over the audio path established for the session.

13 Claims, 7 Drawing Sheets

(56) References Cited

U.S. PATENT DOCUMENTS

| | | | |
|---|---|---|---|
| 2011/0123008 A1* | 5/2011 | Sarnowski | H04L 63/0853 379/93.02 |
| 2011/0202461 A1* | 8/2011 | Lundgren | G06Q 20/1085 705/44 |
| 2013/0096916 A1 | 4/2013 | Pemmaraju | |
| 2013/0101099 A9 | 4/2013 | Sarnowski | |
| 2014/0073355 A1* | 3/2014 | Ward | H04W 4/02 455/456.2 |
| 2014/0215563 A1* | 7/2014 | Kang | G06F 21/35 726/3 |
| 2015/0095992 A1* | 4/2015 | Metral | H04L 63/10 726/5 |
| 2015/0105046 A1* | 4/2015 | Grosby | H04W 12/06 455/411 |
| 2015/0142623 A1* | 5/2015 | Ferguson | G06F 21/88 705/30 |

* cited by examiner

DTMF TOKEN FOR AUTOMATED OUT-OF-BAND AUTHENTICATION

BACKGROUND

Out-of-band authentication is a process in which one party in a communication session verifies the identity of another party by sending a message outside of the established session to the party with whom they believe they are communicating and confirming that the other party in the session received the message. For example, if a person is participating in an instant messaging (IM) chat with someone they believe is a particular friend, the person may call their friend's telephone to ask whether that friend is indeed the other party in the IM session. In this example, the IM session represents the established interaction and the telephone call represents an out-of-band (also called out-of-network) authentication process. As another example, an online retailer may request that a financial institution (e.g., a credit-card issuing bank) verify that a certain payment is actually being made by the owner of a certain payment account. In that case, the payment processor may send a verification code to the account owner (e.g., through email) and, the retailer may require that the same code be entered on their website before accepting payment.

A problem, recognized by the present inventor, is that current out-of-band authentication schemes require the second party to perform particular actions in response to receiving the out-of-band communication. For instance, in the IM session example, the authentication required that the friend answer their phone and confirm their presence in the session. In the online retailer example, the owner would need to check their email and enter a verification code in order to complete their purchase. Requiring such specific second-party interaction, however, can be slow and imprecise in addition to potentially annoying to the second party.

SUMMARY OF THE DISCLOSURE

As will be shown, the present disclosure relates to methods, systems, and media that may help to increase the simplicity and efficiency of the out-of-band authentication process.

In one embodiment, an example method may involve a processor receiving a first signal indicative of an authentication token via a first communication network. In response to receiving the signal, the processor may automatically generate a second signal that is indicative of the authentication token for transmission over a second communication network. The method may also involve the processor automatically transmitting the second signal via the second communication network. In an example embodiment, either the first signal or the second signal is a dial-tone multi-frequency (DTMF) signal.

In another embodiment, an example system includes a first network interface configured to communicate on a first network, a second network interface configured to communicate on a second network, and a processor. The processor is configured to perform functions including receiving a signal indicative of an authentication token via the first network. The functions may also involve, in response to receiving the first signal, automatically generating a second signal that is indicative of the authentication token, where the second signal is suitable for transmission through the second communication interface. The functions may also include automatically transmitting the second signal via the second communication network. In an example embodiment, either the first signal or the second signal may be a DTMF signal.

In a further embodiment, an example computer-readable medium contains program instructions that, when executed, cause a processor to perform various functions. The functions may include may receiving a first signal indicative of an authentication token via a first communication network. The functions may also include, in response to receiving the signal, automatically generating a second signal that is indicative of the authentication token for transmission over a second communication network. The functions may also involve the processor automatically transmitting the second signal via the second communication network. In an example embodiment, either the first signal or the second signal is a DTMF signal.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent in the detailed description set forth herein and taken in conjunction with the accompanying drawings.

DETAILED DESCRIPTION

I. Example System Architecture

Functions and procedures described herein may be executed according to any of several embodiments. For example, procedures may be performed by specialized equipment that is designed to perform the particular functions. As another example, the functions may be performed by general-use equipment that executes commands related to the procedures. As still another example, each function may be performed by a different piece of equipment with one piece of equipment serving as control or with a separate control device. As a further example, procedures may be specified as program instructions on a computer-readable medium.

Figure 1:
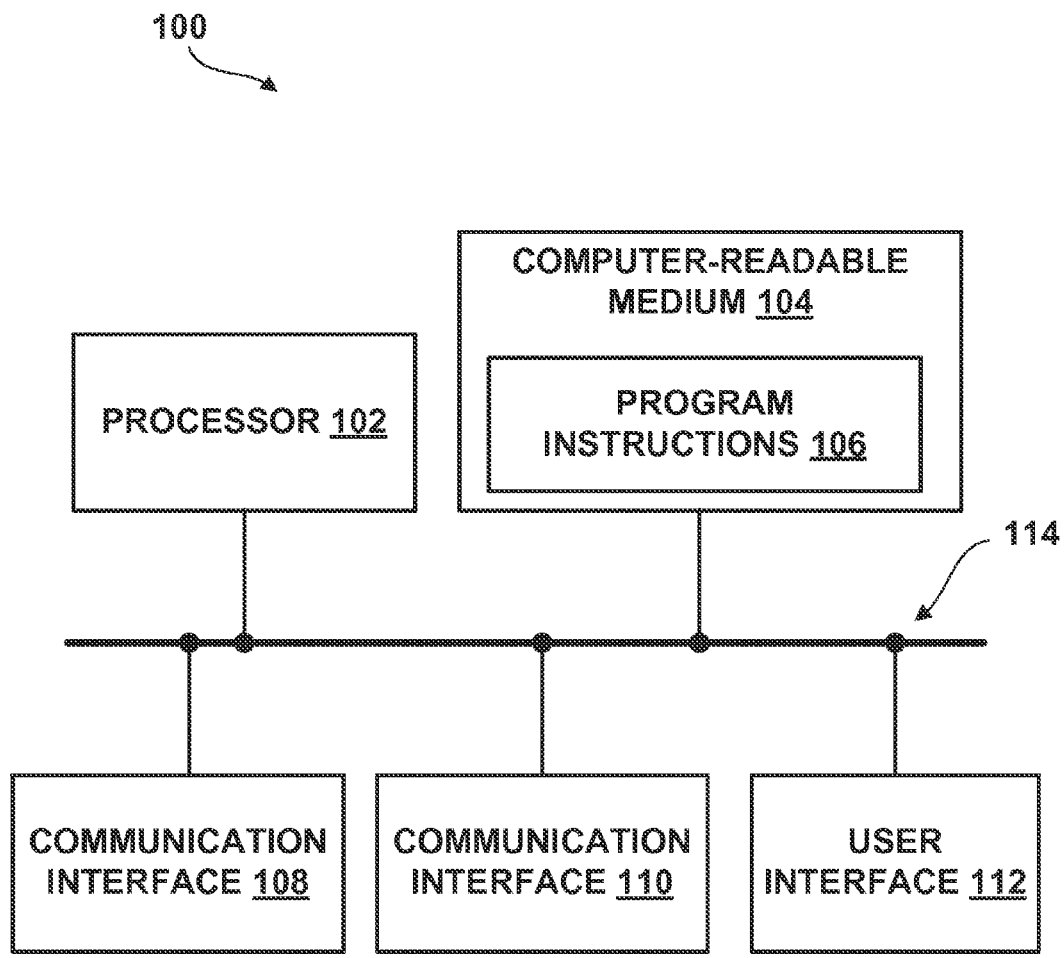
FIG. 1 is a schematic diagram of an example system for performing functions according to an exemplary embodiment.

One example system (100) is shown in FIG. 1. As shown, system 100 includes processor 102, computer-readable medium (CRM) 104, communication interfaces 108 and 110, and user interface 112 all connected through system bus 114. Also as shown, program instructions 106 are stored on computer-readable medium 104.

Processor 102 may include any processor type capable of executing program instructions 106 in order to perform the functions described herein. For example, processor 102 may be any general-purpose processor, specialized processing unit, or device containing processing elements. In some cases, multiple processing units may be connected and utilized in combination to perform the various functions of processor 102.

CRM 104 may be any available media that can be accessed by processor 102 and any other processing elements in system 100. By way of example, CRM 104 may include RAM, ROM, EPROM, EEPROM, CD-ROM or other optical disk storage, magnetic disk storage or other magnetic storage devices, or any other medium that can be used to carry or store desired program code in the form of program instructions or data structures, and which can be executed by a processor. When information is transferred or provided over a network or another communications connection (either hardwired, wireless, or a combination of hardwired or wireless) to a machine, the machine properly views the connection as a CRM. Thus, any such connection to a computing device or processor is properly termed a CRM. Combinations of the above are also included within the scope of computer-readable media.

Program instructions 106 may include, for example, instructions and data capable of causing a processing unit, a general-purpose computer, a special-purpose computer, special-purpose processing machines, or server systems to perform a certain function or group of functions.

Communication interfaces 108 and 110 may include, for example, wireless chipsets, antennas, wired ports, signal converters, communication protocols, and other hardware and software for interfacing with external systems. For example, system 100 may receive text, audio, executable code, video, digital information or other data via communication interfaces 108 and 110 from remote data sources (e.g., remote servers, internet locations, intranet locations, wireless data networks, etc.) or from local media sources (e.g., external drives, memory cards, specialized input systems, wired port connections, wireless terminals, etc.) Example communication networks include Public Switched Telephone Network (PSTN), Public Switched Data Network (PSDN), a short message service (SMS) network, a local-area network (LAN), a voice over IP (VoIP) network, a wide area networks (WAN), a virtual private network (VPN), a campus area network, and the Internet. An example network may communicate through wireless, wired, mechanical, and or optical communication links. Many other communication networks may also be suitable for the embodiments discussed herein.

In an example embodiment, interfaces 108 and 110 are configured to communicate over different communication networks. In some cases, interfaces 108 and 110 could include separate hardware and/or software elements for communicating on the different networks. In other cases, interfaces 108 and 110 could communicate over the different networks using some or all of the same hardware and software elements. In such a case, interfaces 108 and 110 may differ in that they communicate with different network elements either initially upon leaving the device or subsequently in the communication network. Alternatively, interfaces 108 and 110 may differ in that they are associated with different network locations. For example, interfaces 108-0110 may occupy different IP addresses, phone numbers, transport-layer ports (e.g., TCP, UDP, RTP port numbers or RSVP routing addresses), MAC addresses, VPNs, POP3 addresses, home location registers, or physical LAN ports. As another alternative, interfaces 108 and 110 may send different types of data so that, although the data comes from the same network address, network elements may distinguish between the data types and route the signaling through the appropriate network.

User-interface 112 may facilitate receiving user-input and user-commands into system 100 and outputting information and prompts for presentation to a user. Although such interfaces typically connect with human users, user-interface 112 may alternatively connect to automated, animal, or other non-human "users." Additionally, while input and output are described herein as occurring with a user is present, user-interface 112 need not present information to any actual user in order for present functions to be performed. User-input may be received as, for instance, wireless/remote control signals, touch-screen input, actuation of buttons/switches, audio input, motion input, lack of interaction for a predefined time period, and/or other user-interface signals. Information may be presented to the user as, for instance, video, image presentation, audio signals, text, remote device operation, mechanical signals, media file output, etc. In some cases, separate devices may be operated to facilitate user-interface functions.

An example system may also include a variety of devices or elements other than those shown in FIG. 1. For example, system 100 may include visual displays or audio output devices to present results of an example process. As another example, CRM 104 may store computer applications for specific data-generation or data-processing functions. Other examples are possible.

Figure 2:
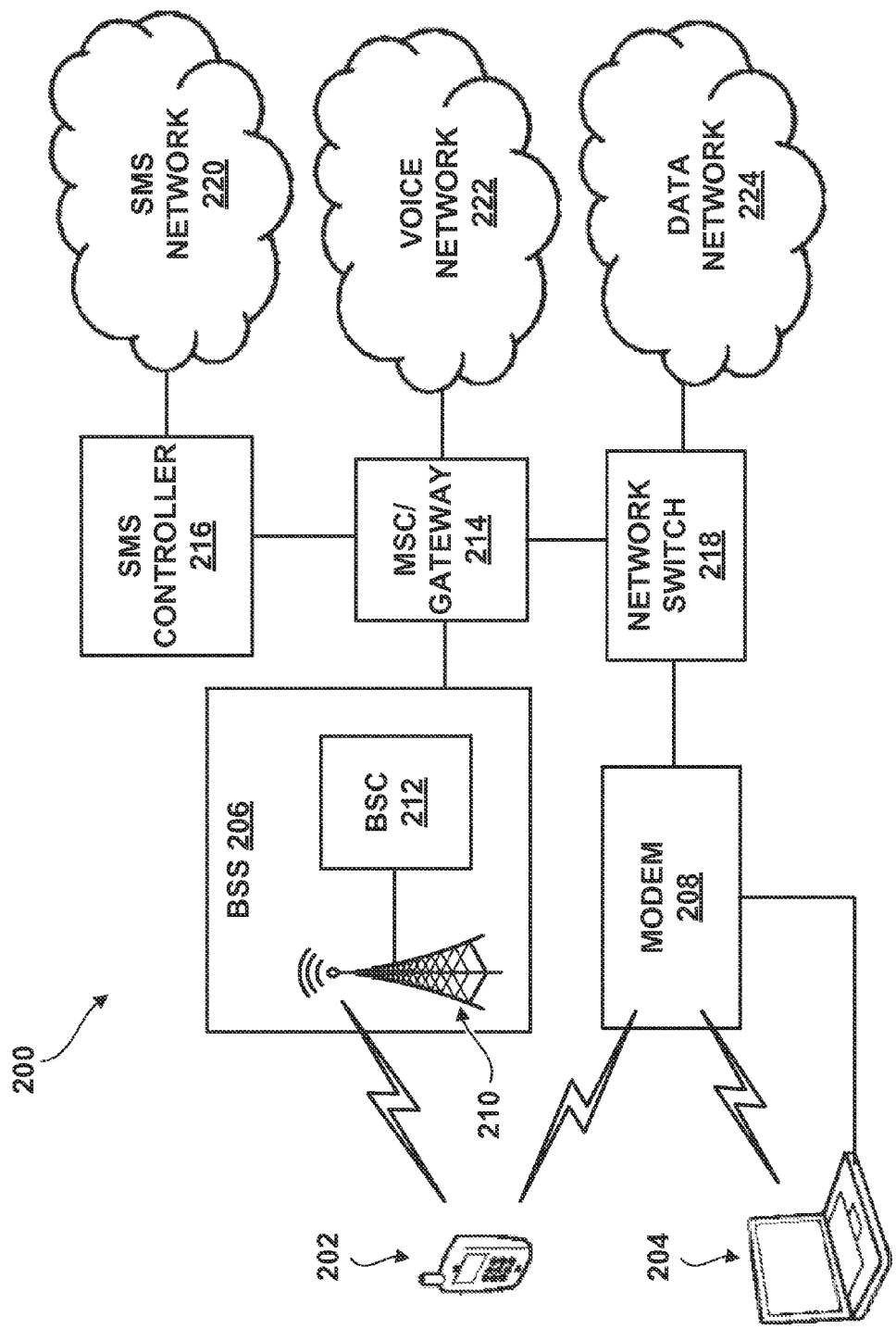
FIG. 2 is a schematic diagram of example communication networks.

FIG. 2 illustrates various elements of a network architecture that may be used in the present embodiments. As shown, computing devices 202 and 204 may communicate through various wired and wireless paths with other network elements. For example, wireless device 202 may communicate via an air interface with a base transceiver station (BTS) 210. BTS 210 is a part of base station subsystem (BSS) 206, along with base station controller (BSC) 212. BSS 206 connects in turn to a mobile switching center and gateway node (MSC/Gateway 214), which connects to wide area networks such as voice network 222, SMS network 220, and data network 224. As shown, MSC/Gateway 214 connects to SMS network 220 through SMS controller 216 and connects to data network 224 through network switch 218. Although these networks are represented by separate network symbols, this should not imply that the networks are entirely exclusive. For example, SMS network signaling may flow through the same devices and connections as data network signaling, but with different transport-layer characteristics.

Figure 7:
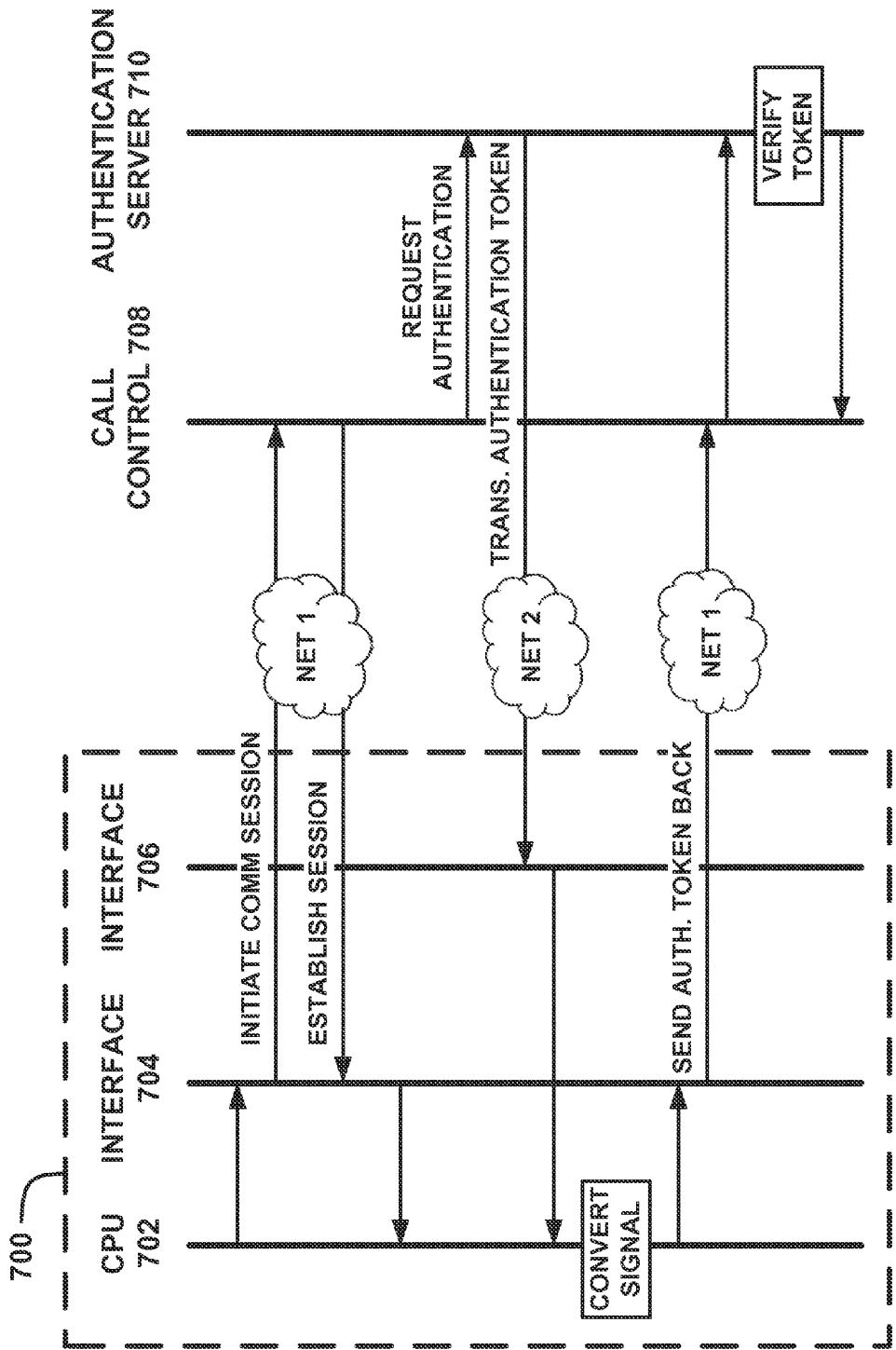
FIG. 7 is a data-flow diagram showing a communication process according to an example embodiment.

Also as shown in FIG. 7, computing devices 202 and 204 may connect to the wide area networks via modem 208 though an air interface or wired connection. Many other example computing devices, routing systems, control interfaces, and network definitions may be used in addition to or instead of the elements shown. As discussed above, separate networks may be defined in numerous ways and should not be limited to separate pathways or wide-area networks in order to constitute different networks for the present embodiments.

II. Example Methods

Figure 3:
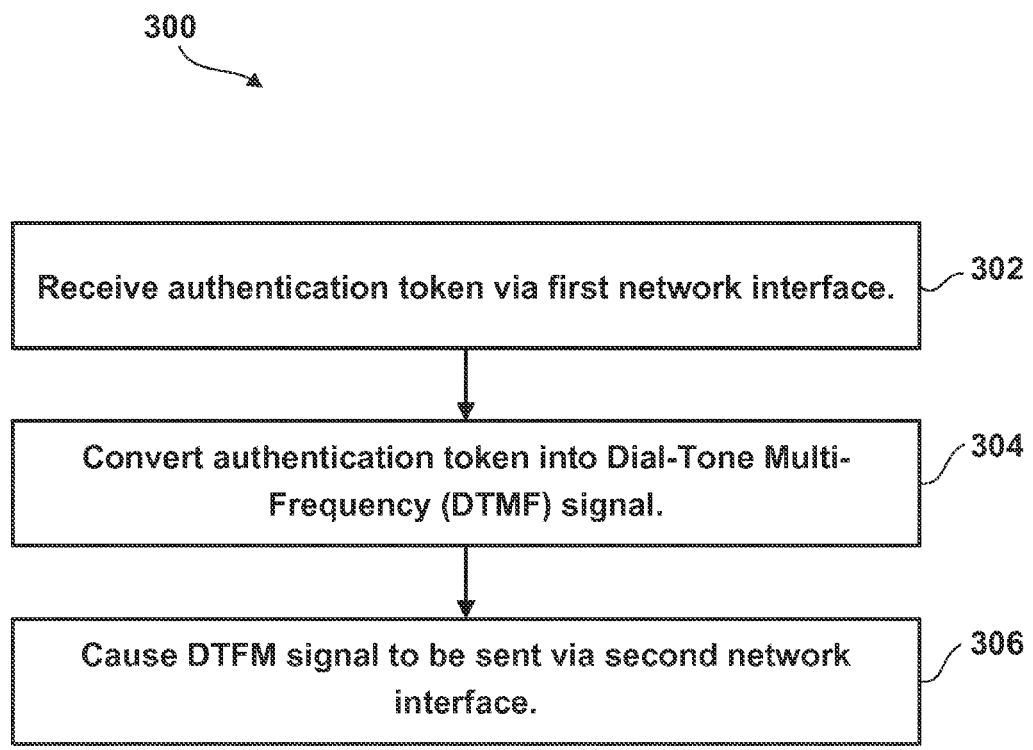
FIG. 3 is a flowchart showing process steps according to an exemplary embodiment.

FIG. 3 is a flowchart illustrating an out-of-band authentication method 300, which may be performed along by system 100, along with other example systems. Method 300 may include additional, fewer, or different operations or steps than those shown, depending on the particular embodiment. As shown, method 300 involves receiving an authentication token via a first network interface. (step 302). Method 300 also involves converting the received authentication token into a DTMF signal (step 304). Further, method 300 involves causing DTMF signal to be sent via a second network interface (step 306).

Figure 4:
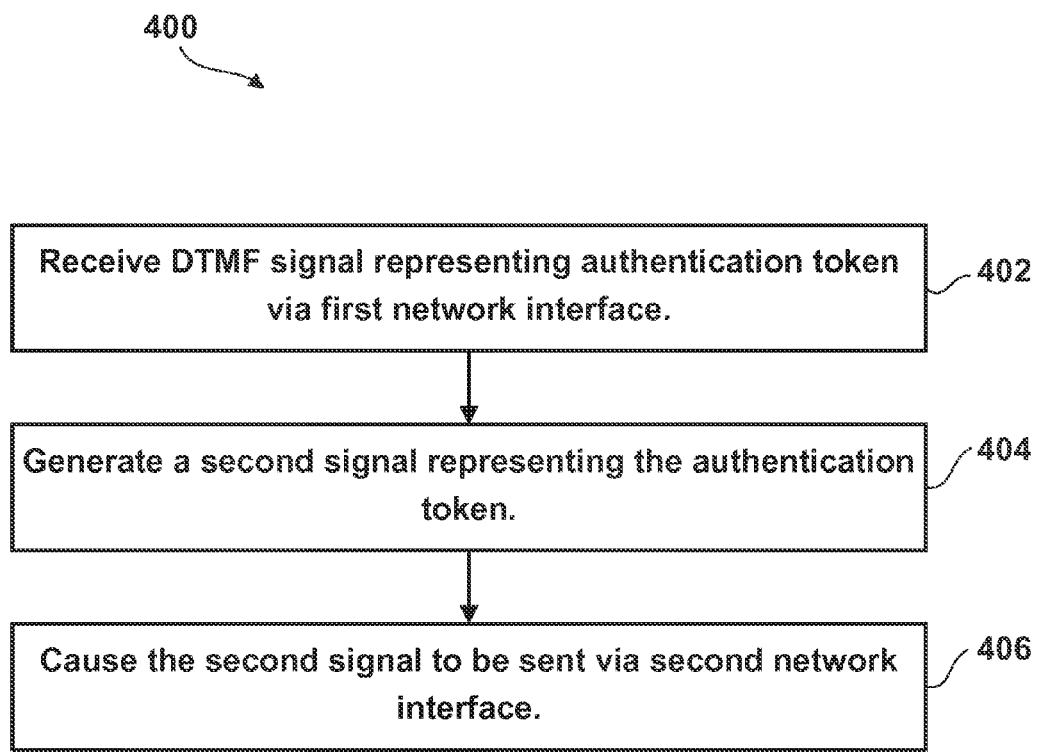
FIG. 4 is a flowchart showing process steps according to an exemplary embodiment.

FIG. 4 is a flowchart illustrating another out-of-band authentication method 400. As shown, method 400 involves receiving a DTMF signal representing an authentication token via a first network interface (step 402). Method 400 also involves generating a second signal representing the authentication token (step 404). Further, method 400 also involves causing the second signal to be sent via a second network interface (step 406).

Figure 5:
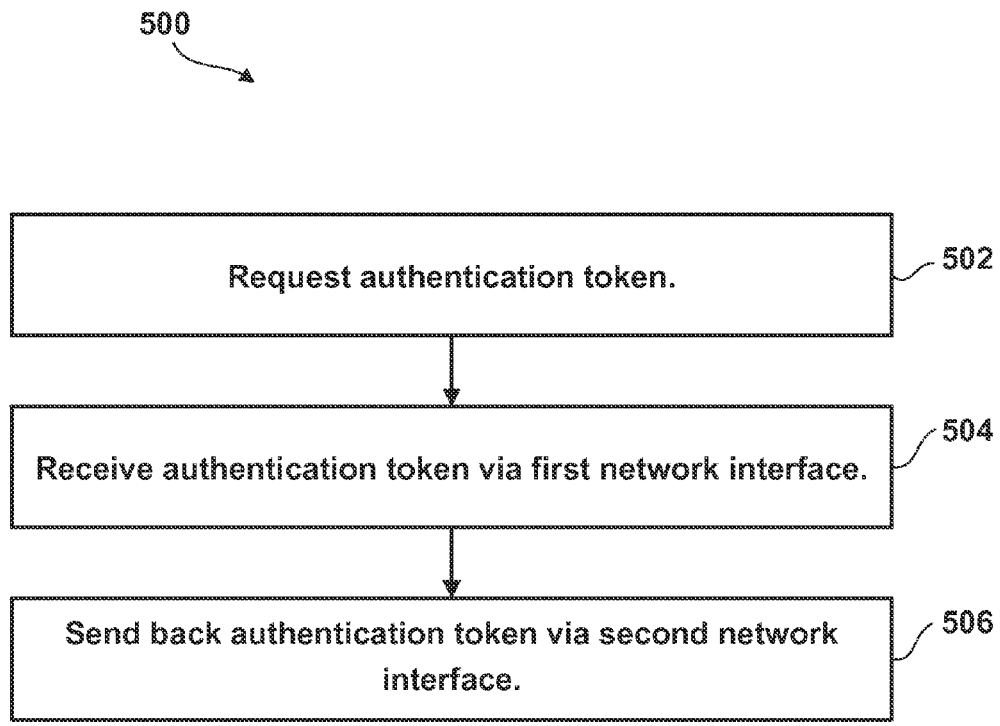
FIG. 5 is a flowchart showing process steps according to an exemplary embodiment.

FIG. 5 shows another out-of-band authentication method 500. As shown, method 500 involves requesting an authentication token (step 502). Method 500 also involves receiving the authentication token via a first network interface (step 504). Method 500 also involves sending back the authentication token via a second network interface (step 506).

Figure 6:
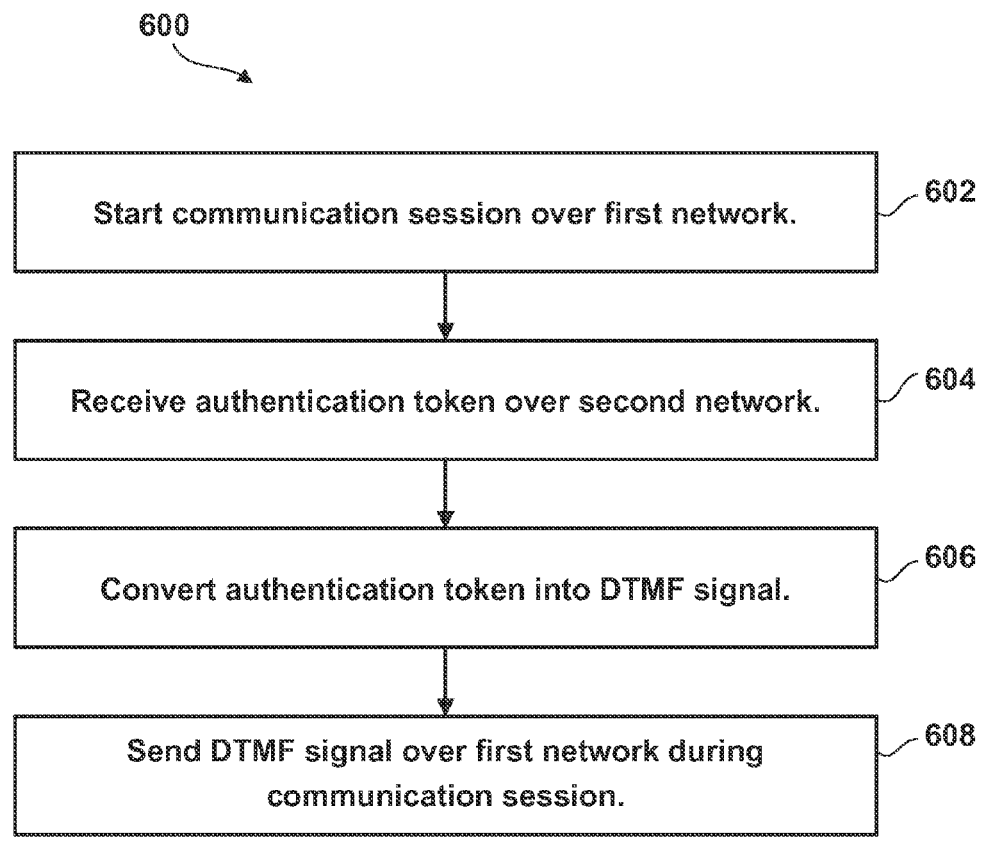
FIG. 6 is a flowchart showing process steps according to an exemplary embodiment.

FIG. 6 shows another example out-of-band authentication method 600. As shown, method 600 involves starting a communication session over a first network (step 602). Method 600 also involves receiving an authentication token over a second network (step 604). Additionally, method 600 involves converting the authentication token into a DTMF signal (step 606). Further, method 600 involves Sending the DTMF over the first network during, or as part of, the communication session.

Although FIGS. 3-6 show particular example arrangements or steps, these arrangements are only examples. Method steps may be ordered in other ways and individual steps may be combined with other steps or omitted without departing from the intended examples. Example methods may also include additional techniques and steps not shown in FIGS. 3-6.

As shown at element 602 of method 600, an example method may involve the computing device initiating a communication session. Any presently known or emerging communication session may constitute the initiated communication session. For example, the communication session may be a voice call, IM, chat, video call, or email correspondence, among other example sessions. In general, such a communication session would be with a system or device associated with the authentication server, which will be discussed in more detail. However, exemplary embodiments may also be used during any arbitrary communication session.

In some exemplary embodiments, the computing device may be capable of carrying on the automated authentication process during the communication session and/or without interrupting the session. For example, the authentication program, may run as a background process or set of processes that are capable of performing functions with only the resources not committed to the communication session. In some cases, the program may be operable to carry on some or all of the authentication process automatically (i.e., without requiring the receipt of any user-input). Although the program may not require user input to function properly, this ability does not prevent the program from also receiving user input. In some embodiments, however, the program or systems may be configured to ignore or prevent user input from being received by the active process. In some cases, the process is operable without user input only during part of the process (e.g., between receiving the first signal and transmitting the second signal). Since the communication session occupies some or all of a first network, the authentication process or program should have access to an interface with at least one other communication network. In some embodiments, the communication session name and form part of the receiving or transmitting steps.

As shown at element 502 of method 500, an example method may involve a computing device requesting an authentication token. In some embodiments, requesting the authentication token may involve the computing device sending a pre-established signal to an authentication server. In such a case, the computing device may store instructions for sending a token request, such as predefined content to be sent in a request and a network location or locations to which requests should be sent. In other cases, requesting the token may involve the computing device responding to a query from the authentication server for a network address associated with a secondary interface of the device. For example, if a device is currently engaged in a voice call the authentication server may send a predefined audio signal indicative of the request for a network location other than the phone numbers associated with the voice call.

The content of an authentication token request may differ based on the particular details the communication session, server protocols, computing device specifications, and/or programming requirements. In some cases, a request may include a network address associated with secondary interface. In other cases, a request may be sent via a secondary interface in order to communicate the network address. For example, the request may simply be a null packet from an IP address on the second network associated with the computing device. As another example, a request may be a predefined message or instruction from a network address associated with the computing device. Any request message may include instructions or protocols for the content, form, or transmission of the signaling that includes the authentication token.

Whether or not a request is sent, an automated authentication program may be activated, either automatically or by input from the user interface, in order to detect the incoming authentication token. For example, an authentication program may track incoming messages/signalling to the computing device (e.g., SMS messages, email, voicemail, video/image messages, audio signals, etc.) and, in response to detecting an authentication token message, initiating the other steps of the automated authentication process. In other cases, the authentication token may be accompanying by executable instructions for starting the authentication program.

The received authentication token may be recognizable symbol, set of symbols, alphanumeric string, code word, optical code, audio signal, video signal, or other pattern. As a particular example, the authentication token may be a 6- to 16-digit number. The computing device may be able to recognize the authentication token and store a description of the token, or the token may be used without recognition/identification of a meaning of the token. As an example of recognition, a numerical token may be stored simply as the computing device would store any other string of numbers.

The signal which is indicative of the authentication token may take any of various forms. For example, the authentication token may be attached to, or contained in, the content of a received message. If the token is an alphanumeric code, for instance, the code may be written in the text of an SMS, IM, or email message. Alternatively, if the code is a video, audio, or picture file, the file may be attached to a similar message or sent through a dedicated file sharing service.

In some cases, the signal which is indicative of the authentication token may be detected from a stream of other signals. For example, if the authentication token is sent as a DTMF signal in the voice-communication path of a voice-communication session, the program or system on the computing device may need to scan through incoming audio signals to detect the authentication token in the audio. Helpfully, the unique audio fingerprint created by the multi-frequency tones of a DTMF signal make the signal both easy for a computing device to recognize and distinctly indicative of a string of numbers or letters. As another example, an authentication program, may scan of all emails coming into a computing device and, based on the content of the email, determine whether any are indicative of an authentication token.

In some cases, the received signal may be indicative of more than just the authentication token. For example, a signal may inform the computing device of the network address (e.g., an IP address, telephone number, MAC location, etc.) to which the response signaling should be sent. Additionally, protocols and formats for transmitting the authentication token may be indicated in the received first signal. Other example information may be included as well.

In response to detecting or being notified of the signal indicative of the authentication token, an exemplary embodiment may automatically perform other steps in the example process. In this way, the embodiments cause certain functions to be performed in response to receiving the authentication token over a first network (or through a first network interface). At step 304 of method 300, one of the potential functions is shown to be converting the received authentication token into a DTMF signal. Such a step may be performed typically when the received signal indicative of an authentication token is not DTMF signal. When the received signal is a DTMF signal, like the example of method 400, the authentication token may be gleaned from the DTMF signal and a new signal/message may be generated to continue the out-of-band authentication process, as shown at step 404.

The conversion process shown at steps 304, 404, and 606 can be performed by determining the authentication token that is represented by the signal received through the first network interface and inserting indicia of that token into a second signal for transmission over a second network. In the case of generating a DTMF signal (as n steps 304 and 606), the represented token may advantageously be an alphanumeric, or entirely numeric, string of characters. Since a standard touch-tone phone produces a unique DTMF signal corresponding to the physical pressing of numbers on the dial pad, an example embodiment may convert a numerical authentication token into the same signal that would be produced by physically pressing the numbers on a phone. Since each of the DTMF signals is also associated with a set of letters, such a conversion could also be accomplished with a code word or mixture of alphanumeric characters. The authentication server to which the signal is sent may employ any type of tone-recognition system (e.g., a standard interactive voice response system) to determine the authentication code from the DTMF signal.

In the case of converting the DTMF signal into a different signal/message (as in step 404), the represented token may be gleaned by converting the distinct pattern of tones into numeric or alphanumeric symbols in a reverse of the previous process. The converted token may then be placed in a signal/message in preparation for transmission via the second network interface.

The converting steps may be performed without presenting anything via the user-interface or requesting input from the user-interface. In this way, the process is performed automatically, without the need for human interaction. Additionally, the process may be performed without interrupting any communication session of the user except for the DTMF being sent over the voice communication system. To minimize this impact, the system may be configured to wait to transmit the DTMF signal until the system recognizes that a user is not speaking Through these steps, the system may send authentication signaling without substantively interfering with the communication session at all.

Once the received authentication signal is sufficiently processed to be transmittable over a second communication network, different from the network through which it was received, the system may transmit the signal. At step 506 of method 500, it is not specified through which type of network the second signal is transmitted. At steps 306 and 608 of methods 300 and 600 respectively, the second signal is sent as a DTMF signal over an audio network (e.g., the voice-communication path of a voice-communication session), whereas the assumption of step 406 of method 400 is that the second signal is sent though some network other than the audio network through which the first signal was received. The second signals may be transmitted in any of the ways described above with respect to the first signals being received. In the example of method 600, the DTMF signal is specifically transmitted during a pre-existing communication session. In some cases, as described above, the signal may be sent over a voice-communication path of the communication path. Such a procedure may be accomplished by playing an audio signal that includes the DTMF signal over the communication session.

The intended recipient of the transmitted authentication signaling is assumed to be the same system as the originator of the first signal, a system that is associated with the originator, or a system that communicates with the originator. However, the design and architecture of the authentication server(s) should not limit the present embodiments. It is advantageous, though, for the sending and receiving systems of the authentication server to communicate at least enough for the server to verify whether the received token matches the sent token. If a match is confirmed, the authentication server(s) may send out an authentication signal informing the authentication-requesting party that the user associated with the computing device has been authenticated through out-of-band authentication. In some cases, the server may also send a confirmation to the computing device to inform the user of the device that a successful authentication process was completed. In the case of a completely automated process, the received confirmation may be the first visible clue to the user that an authentication process was or is being performed.

III. Authentication Process Example Application

To further illustrate the process of an example embodiment, FIG. 7 illustrates the data flow that may take place during one particular authentication example. This example is illustrative but not intended as limiting the invention to this singular set of steps and features.

In the example of FIG. 7, communication signals flow to/from a computing device 700 that includes a processor (shown as CPU 702) and two communication interfaces 704 and 706 in communication with a call control 708 and an authentication server 710. As shown, computing device 700 initiates a communication session by sending a session request over a first network (NET 1) via interface 704 and receiving a communication session establish signal from call control 708 also over NET 1. An example communication session would be a voice call between computing device 700 and a second party (not illustrated) connected through call control 708.

During the communication session, an authentication request is transmitted from call control 708 to authentication server 710. Such a signal may be sent by the second party on the communication session in order to verify the identity of device 700. Responsive to the authentication request, authentication server 710 transmits an authentication token over a second communication network (NET 2) via interface 706 to CPU 702. For example, the authentication token may be transmitted as a six-digit number through an SMS network to a text message application on computing device 700. In response to receiving the authentication token signaling, CPU 702 converts the received signal into a form that may be sent over NET 1 via interface 704. Continuing the example of NET 1 being a voice-communication path, CPU 702 may convert the received authentication token into a series of DTMF tones that represent the series of numbers in the authentication token.

Computing device 700 then sends the authentication token to authentication server 710 or to some networked device in communication with authentication server 710 over NET 1 through interface 704 and call control 708. Such a process may occur, for instance, by (i) computing device playing the DTMF tones over the voice-communication path of the established communication session, (ii) call control 708 detecting the DTMF signal, and (iii) call center 708 forwarding either the DTMF signal itself or the authentication token gleaned from the signal to authentication server 710. Upon receiving the authentication token from computing device 700, authentication server 710 verifies that the received authentication token is the same as the transmitted authentication token and, if the two tokens match, sending a confirmation to the second party through call control 708.

IV. Conclusion

The arrangement and design of the elements of the systems and methods as shown in the exemplary embodiments are illustrative only. Although only a few embodiments of the present disclosure have been described in detail, those skilled in the art who review this disclosure will readily appreciate that many modifications are possible without materially departing from the novel teachings and advantages of the subject matter recited.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the scope of the appended claims.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. An out-of-band authentication method comprising:
   a processor receiving a first signal indicative of an authentication token via a first communication network;
   in response to receiving the signal, the processor automatically generating a second signal that is indicative of the authentication token without input through a user-interface, wherein the second signal is suitable for transmission over a second communication network, and wherein one of the first signal or the second signal is a dial-tone multi-frequency (DTMF) signal;
   the processor automatically transmitting the second signal via the second communication network,
   wherein the first signal is received during a voice-communication session and wherein the second signal is transmitted without substantially interrupting the voice-communication session, wherein the second signal is the DTMF signal, and wherein transmitting the second signal comprises playing the DTMF signal on a voice-communication path of the voice-communication session,
   wherein the first signal is the DTMF signal, and wherein receiving the first signal comprises detecting the DTMF signal from an audio signal received as part of the voice-communication session.

2. The method of claim 1, wherein the authentication token comprises an alphanumeric code, and wherein the first signal is a text message containing the alphanumeric code.

3. The method of claim 1, wherein the authentication token is an alphanumeric code, and wherein the DTMF signal is a series of tones that would result from physical entry of the alphanumeric code on a touch-tone phone.

4. The method of claim 1, further comprising the processor transmitting a request for the authentication token.

5. The method of claim 4, wherein the transmitted request comprises a network location associated with the processor.

6. The method of claim 1, wherein no user-input associated with the out-of-band authentication method is required between receiving the first signal and transmitting the second signal.

7. The method of claim 1, wherein the first signal comprises indicia of a network location on the second communication network, wherein the network location is associated with an authentication server.

8. The method of claim 7, wherein the network location is a telephone number for the server.

9. The method of claim 1, wherein the first signal comprises instructions for automatic response through an interactive voice response system.

10. A non-transitory computer-readable medium having stored thereon instructions executable by a processor to cause a computing device to perform functions comprising:
    receiving a first signal indicative of an authentication token via a first communication network;
    in response to receiving the signal, automatically generating a second signal that is indicative of the authentication token without input through a user-interface, wherein the second signal is suitable for transmission over a second communication network different from the first communication network, and wherein one of the first signal or the second signal is a dial-tone multi-frequency (DTMF) signal; and automatically transmitting the second signal via the second communication network,
wherein the first signal is received during a voice-communication session and wherein the instructions are executable to cause transmission of the second signal without ending the voice-communication session, wherein the second signal is the DTMF signal, and wherein transmitting the second signal comprises playing the DTMF signal on a voice-communication path of the voice-communication session.

11. The non-transitory computer-readable medium of claim 10, wherein no user-input associated with the performed functions is requested between receiving the first signal and transmitting the second signal.

12. A system comprising:
   a first communication interface configured to communicate on a first communication network;
   a second communication interface configured to communicate on a second communication network different than the first communication network;
   a processor configured to perform functions comprising:
      receiving a first signal indicative of an authentication token via the first communication interface;
      in response to receiving the signal, automatically generating a second signal that is indicative of the authentication token without input through a user-interface, wherein the second signal is suitable for transmission through the second communication interface, and wherein one of the first signal or the second signal is a dial-tone multi-frequency (DTMF) signal; and
      automatically transmitting the second signal via the second communication network,
   wherein the first signal is received during a voice-communication session and wherein the instructions are executable to cause transmission of the second signal without ending the voice-communication session, wherein the second signal is the DTMF signal, and wherein transmitting the second signal comprises playing the DTMF signal on a voice-communication path of the voice-communication session.

13. The system of claim 12, wherein no user-input associated with the performed functions is requested between receiving the first signal and transmitting the second signal.

\* \* \* \* \*